United States Patent [19]

Darnell et al.

[11] 4,020,915
[45] May 3, 1977

[54] EXHAUST SYSTEM FOR LIFT TRUCKS

[75] Inventors: William E. Darnell, Mentor; Richard J. Malecha, Cleveland, both of Ohio

[73] Assignee: Towmotor Corporation, Mentor, Ohio

[22] Filed: Sept. 2, 1975

[21] Appl. No.: 609,887

[52] U.S. Cl. .............................. 180/64 A; 180/54 A
[51] Int. Cl.² .................. B60K 13/04; B60K 13/06
[58] Field of Search ..................... 180/64 A, 54 A

[56] References Cited

UNITED STATES PATENTS

| 1,856,005 | 4/1932 | Tomshow | 180/64 A X |
|---|---|---|---|
| 2,138,001 | 11/1938 | Fluor, Jr. | 180/64 A X |
| 2,242,494 | 5/1941 | Wolf | 180/64 A X |
| 3,735,594 | 5/1973 | Johnson et al. | 60/319 |
| 3,863,445 | 2/1975 | Heath | 180/64 A X |
| 3,866,580 | 2/1975 | Whitehurst et al. | 180/54 A X |

FOREIGN PATENTS OR APPLICATIONS

| 750,170 | 6/1956 | United Kingdom | 180/64 A |
|---|---|---|---|
| 870,112 | 6/1961 | United Kingdom | 180/64 A |

OTHER PUBLICATIONS

Exhaust-Stack Ejectors for Marine Gas Turbine Installations, by A. L. London, Technical Report No. 26, Department of Mechanical Engineering, Stanford, University, Standford, California, July, 1955.

*Primary Examiner*—Joseph F. Peters, Jr.
*Assistant Examiner*—Milton L. Smith
*Attorney, Agent, or Firm*—Phillips, Moore, Weissenberger Lempio & Majestic

[57] ABSTRACT

The invention is concerned with an improved exhaust system for a lift truck. The lift truck comprises an engine within an engine housing, an exhaust stack, an operator seat, an overhead structure above the operator defining an operators compartment and a plurality of forks or other load engaging means controllably moveable vertically adjacent a forward end of the truck. The improved exhaust system comprises a first conduit affixed at an upstream end thereof to the engine to receive exhaust gas flow therefrom, the first conduit ending at a nozzle at a downstream end thereof. A second conduit of larger cross section than the first conduit is aligned to receive the nozzle and to accept gas flow therefrom along with ambient air and conduct said gas flow and air to said exhaust stack, which stack forms a vertical support of said overhead structure.

2 Claims, 2 Drawing Figures

EXHAUST SYSTEM FOR LIFT TRUCKS

BACKGROUND OF THE INVENTION

1. Field of the Invention

The invention is concerned with an improvement in a lift truck and more particularly with an improvement in the exhaust system therefor. Lift trucks typically include an engine housing with an engine within it, an operator seat usually more or less atop of the housing and an overhead structure above the seat defining an operators compartment, the structure serving to protect the operator from falling objects along with a plurality of forks controllably moveable vertically about a front end of the truck.

2. Prior Art

Lift trucks, often called fork lifts are well known to the prior art and generally include an engine housing with an engine therewithin, moveable load engaging means such as forks adjacent a forward end of the truck, an overhead structure defining an operators compartment to protect the operator from falling objects and an exhaust stack usually located in the vicinity of the floor upon which the truck normally drives. Such lift trucks have suffered from the problem of relatively hot and contaminated exhaust gases being expelled adjacent floor level whereby the operator of the lift truck and others working in the area have been exposed to such gases. The cooling of the engines of lift trucks has also created some problems and since these lift trucks tend to operate under relatively heavy load conditions as when moving generally many hundreds of pounds of material, equipment or the like from one place to another, heating problems of the engine of a lift truck are especially serious.

It would be highly desirable to provide a lift truck wherein the exhaust gases therefrom were significantly cooled prior to injection into the surrounding atmosphere. It would be even more advantageous if such an exhaust gas cooling system would also serve to help to draw cool air into the engine housing of a lift truck whereby the engine would be at least partially cooled by said cool air. It would still be further advantageous if such an improved exhaust system would be operable without any physical connection between the exhaust stack of the lift truck and the conduit accepting air from the engine whereby long life would result for the system due to its having no touching parts. It would be still more advantageous if the exhaust gases from the exhaust stack of a lift truck were to be expelled well above the heads of nearby workers as well as above the head of the operator of the lift truck to minimize health hazards. Still more advantageous would be the provision of such a system wherein the exhaust stack which caused the exhaust gasses to be expelled well above the heads of workers in the area of the lift truck would also serve as a support member for the overhead guard of a lift truck whereby through this double use of the exhaust stack savings in material and hence in cost would result. The present invention is concerned with an improved exhaust system which in its various embodiments accomplishes the above desired results.

SUMMARY OF THE INVENTION

The invention is concerned with an improved exhaust system for use in a lift truck comprising an engine within an engine housing, an exhaust stack, an operator seat, an overhead structure above said seat defining an operators compartment and load engaging means controllably moveable vertically adjacent a forward end of said lift truck. The improved exhaust system comprises a first conduit affixed at an upstream end thereof to said engine to receive exhaust gas flow therefrom, said first conduit ending at a nozzle at a downstream end thereof, and a second conduit of larger cross section than said first conduit aligned to receive said nozzle and to accept gas flow therefrom along with ambient air and conduct said gas flow and air to said exhaust stack, said stack comprising a support for said overhead structure and said stack including a gas and air flow exit adjacent the top of said overhead structure.

BRIEF DESCRIPTION OF THE DRAWINGS

The invention will be better understood by reference to the figures of the drawing wherein like numbers denote like parts throughout and wherein.

DETAILED DESCRIPTION OF THE PREFERRED EMBODIMENT

Figure 1:
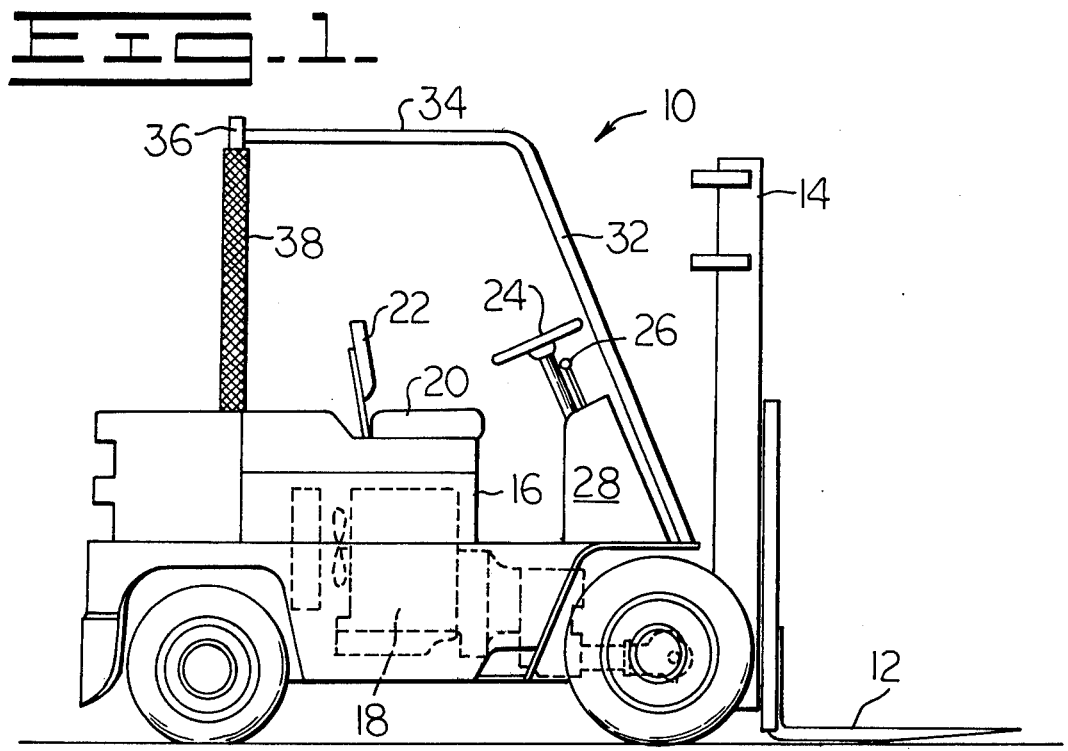
FIG. 1 illustrates a lift truck incorporating the improved exhaust system of the present invention.

Referring first to FIG. 1, there is illustrated therein a lift truck 10 which includes load engaging means, in the embodiment illustrated forks 12 adjacent a forward end thereof and riding in a normal manner upwardly and downwardly upon masts 14. A housing 16 includes therein an engine 18. Above the housing 16 there is a seat 20 and a backrest 22. Forwardly of the seat 20 is a steering wheel 24 and a control know 26 extending from a control panel 28. Above the seat 20 is an overhead structure including a guard 30 held in place by generally vertical supports 32 and generally horizontal supports 34, one of the generally vertical supports 32 serving as an exhaust stack 36, said exhaust stack being open at an upward end to allow exhaust gasses from the engine to exit therefrom well above floor level. A cylindrical screen 38 is provided about the exhaust stack 36 to protect the operator and others in the area of operation of the lift truck 10 from any heating up of the exhaust stack 36. Thus, the cylindrical screen 38 prevents direct physical contact between a person in the vicinity of the lift truck 10 with the hot exhaust stack 36.

Figure 2:
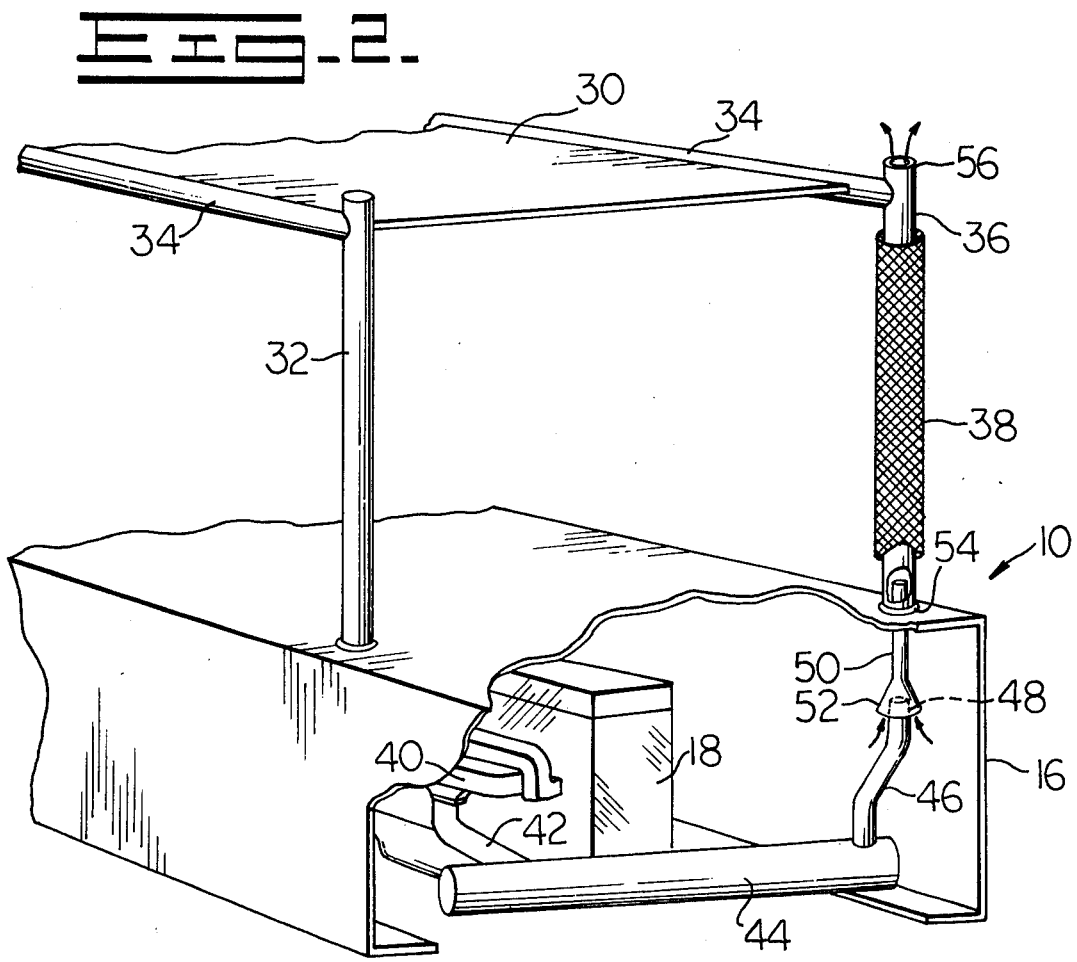
FIG. 2 illustrates in partially cut-away view the improved exhaust system of the present invention along with some structural parts of the lift truck.

Referring now most particularly to FIG. 2, exhaust from the engine 18 of the lift truck 10 is seen to exit via an exhaust manifold 40, a pipe 42 and a muffler 44 to a first conduit 46. The first conduit 46 ends in a nozzle 48 at the downstream end thereof. The first conduit receives exhaust gas flow from the engine 18 and is affixed to the engine 18 via the exhaust manifold 40, the pipe 42 and the muffler 44. A second conduit 50 of larger inlet cross section at a mouth 52 then said nozzle 48 is aligned to receive the nozzle 48 and to accept gas flow therefrom along with ambient air from the interior of the housing 16 and to conduct the gas flow and air to the exhaust stack 36 as by passing through the housing 16 and being attached thereto at 54.

As will be clear from examination of FIG. 2, the nozzle 48 floats freely relative to the second conduit 50 thus allowing for both vertical and side to side movement of the nozzle 48 relative to the mouth 52 without any actual physical contact taking place between the nozzle 48 and the second conduit 50. The venturi action of the hot exhaust gasses as they pass through the nozzle 48 within the mouth 52 of the second conduit 50 leads to a good strong flow of ambient air from the housing 16 about the engine 18 and therefrom up the exhaust stack 36. This leads to improved cooling of the interior of the housing 16 and thus of the engine 18. Also, the exhaust gas passing through the exhaust stack 36 is cooled thereby keeping the exhaust stack 36 relatively cool and protecting the operator of the lift truck 10. The muffler 44 serves its usual purpose in quieting the engine whereby noise pollution in the vicinity of the lift truck is minimized.

The exhaust stack 36 serves a dual purpose in that it not only serves as an exhaust stack but also as a generally vertical support for the overhead guard 30. This allows for a saving both in the time of construction of the lift truck 10 and in the cost thereof. Because the exhaust stack 36 serves as a generally vertical support for the overhead guard 30 and because the exhaust stack 36 is open to the atmosphere to allow exhaustion therefrom of the exhaust gas flow and ambient air at a top end 56 thereof the exhaust gasses are let out into the atmosphere far above the floor and generally above the head of the operator of the lift truck 10 and of other persons working in the vicinity of said lift truck 10. This is clearly advantageous in protecting the health of lift truck operators and other persons working in their vicinity. The pick up of ambient air within the housing 16 and its flow out through the exhaust stack 36 along with the exhaust gas flow from the engine 18 also serves a dual purpose in that it cools the exhaust gas flow sufficiently so that a person touching the exhaust stack will generally not be burned by contact therewith. As an added safety feature, the cylindrical screen 38 about the exhaust stack 36 serves to prevent anyone from touching the exhaust stack 36 adjacent its lower and hence warmer end.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In a lift truck comprising an engine in an engine housing, an exhaust stack, an operator's seat, an overhead structure above said seat defining an operator's compartment and a load engaging means controllably movable vertically adjacent a forward end of said lift truck an improved exhaust system, comprising:
    a first conduit affixed at an upstream end thereof to said engine to receive exhaust gas flow therefrom, said first conduit ending at a nozzle at a downstream end thereof;
    a muffler intermediate said engine and an upstream end of said first conduit;
    a second conduit of larger inlet cross section than said nozzle aligned to receive said nozzle and to accept gas flow therefrom along with ambient air and conduct said gas flow and said air to said exhaust stack, said stack comprising a support for said overhead structure, said second conduit being affixed to said housing and said nozzle floating freely relative to said second conduit; and
    a unitary multiply perforate generally cylindrical member surrounding said support for protecting an operator of said vehicle and others in the area of operation of said vehicle from harm caused by heating up of said support caused by gas flow therethrough.

2. An improved exhaust system for a lift truck as in claim 1, wherein said cylindrical member comprises a cylindrical screen.

* * * * *